United States Patent [19]
Flachbarth et al.

[11] 4,209,660
[45] Jun. 24, 1980

[54] OUT-OF-SIGHT SERVICE FITTINGS

[75] Inventors: Charles T. Flachbarth; Robert W. Hadfield, both of Parkersburg, W. Va.

[73] Assignee: Textron Inc., Providence, R.I.

[21] Appl. No.: 940,251

[22] Filed: Sep. 7, 1978

[51] Int. Cl.² .................................................. H02G 3/12
[52] U.S. Cl. ........................................ 174/48; 174/57
[58] Field of Search .................. 174/48, 49, 57, 67, 174/96, 98; 220/3.7, 242; 52/221

[56] References Cited

U.S. PATENT DOCUMENTS

| | | | |
|---|---|---|---|
| 3,318,476 | 5/1967 | Clark | 174/57 X |
| 3,701,837 | 10/1972 | Fork | 174/49 X |
| 3,724,150 | 4/1973 | Hudnall | 52/221 |
| 3,784,042 | 1/1974 | Hadfield et al. | 174/48 X |
| 3,932,696 | 1/1976 | Fork et al. | 174/48 |
| 4,041,238 | 8/1977 | Penczak | 174/48 |
| 4,096,347 | 6/1978 | Penczak et al. | 174/48 |
| 4,139,725 | 2/1979 | Guritz | 174/49 |

Primary Examiner—B. A. Reynolds
Assistant Examiner—D. A. Tone
Attorney, Agent, or Firm—Frederick J. Olsson

[57] ABSTRACT

Power and communication service fitting buried in concrete beneath the floor covering so as to be out-of-sight. Only the power/communication service cables from the fitting below extend above the floor covering surface. A cover is easily removable to provide access to the interior.

5 Claims, 12 Drawing Figures

OUT-OF-SIGHT SERVICE FITTINGS

This invention relates to under floor electrical power and communication distribution systems.

In particular, the invention relates to improved power-communication service fittings installed out-of-sight below the floor with the only visible components being the power and/or communication cables extending up thru the carpet and a carpet trim ring flush with the carpet.

The out-of-sight concept eliminates the use of floor mounted fittings which are sometimes objectionable from the standpoint of aesthetics and in some instances present a tripping hazard.

The preferred structure of the invention and its several attendant advantages will be noted from the description below taken in conjunction with the following drawings wherein.

Figure 1:
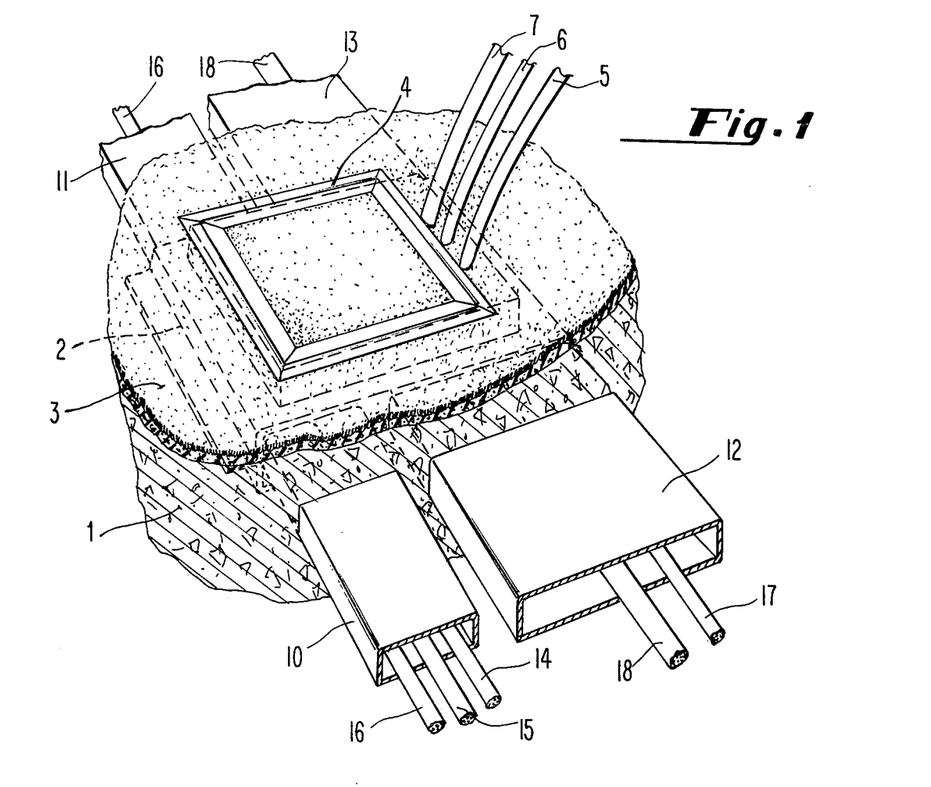
FIG. 1 is an above-the-surface view of a typical installation.
Figure 4:
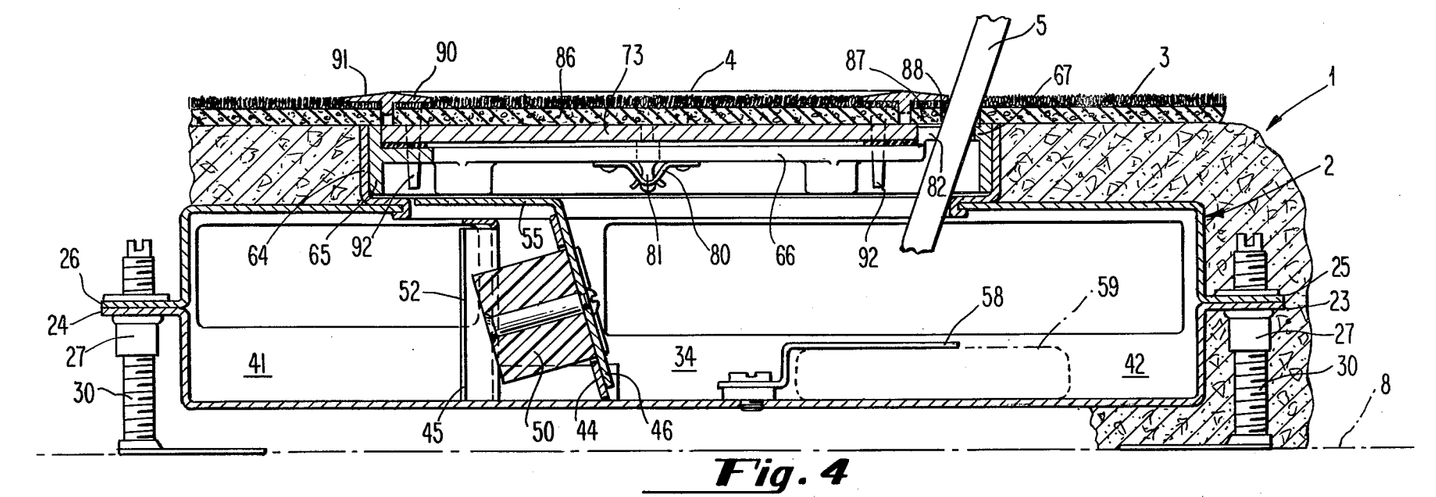
FIG. 4 is a view taken along the lines 4—4 of FIG. 2.
Figure 5:
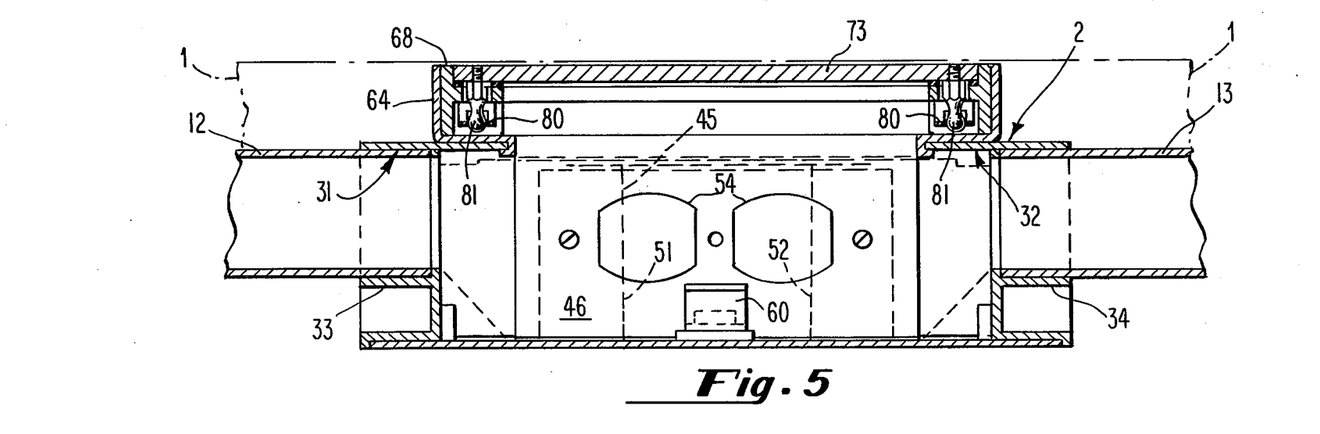
FIG. 5 is a view taken along the lines 5—5 of FIG. 3.

In FIG. 1 we have illustrated a section of a concrete floor 1 having the service fitting 2 buried in the concrete beneath the floor covering or carpeting 3. A trim piece 4 connected to the fitting covers cut edges of the carpet as will be explained later. Power service cables 5 and 6 and the communications service cable 7 from the fitting 2 exit up thru the carpet. The manner in which the fitting 2 is buried in the concrete below the carpet 3 is best illustrated in FIG. 4. Note that the floor 1 overlies a base floor or form indicated by dotted lines 8, the latter being removed after the pour has hardened.

The fitting is serviced by the power ducts 10 and 11 connected yo opposite sides of the fitting and by the communications ducts 12 and 13 also connected to opposite sides of the fitting.

The power ducts carry the power cables such as cables 14, 15 and 16. In the particular arrangement illustrated, the cables 14 and 15 are connected in the fitting 2 to provide power for the service cables 5 and 6 while the power cable 16 continues thru the fitting 2 down the run. The communications ducts carry the communications cables 17 and 18. The communication cable 17 is connected in the fitting to provide the power to the communications service cable 7. The communications cable 18 continues thru the fitting on down the run.

The structural details of the fitting 2 will now be described. The fitting has a housing means 20 including a U-shaped base section 21 and a U-shaped top section 22 which form a hollow interior chamber.

The base section 21 has a pair of flanges 23 and 24 respectively at opposite ends. The top section 22 overlies the base section 21 and has a pair of flanges 25 and 26 respectively engaging the flanges 23 and 24. The Riv-Nuts 27 fixedly hold the flanges together. The Riv-Nuts carry adjusting screws 30 resting on the base or form 8 and which provide the means for moving the fitting in a vertical direction as may be required for leveling purposes during the pour.

The housing has duct openings 31 and 32 which extend between the flanges and respectively carry the adaptors 33 and 34 which are fixed in position by the nut/bolt assemblies 35. The adaptors have sockets which carry the power and communication ducts such as the sockets 36 and 37 formed in the adaptor 33. The sockets are separated by center sections such as the center section 38 for the sockets 36 and 37. The adaptor 34 is identically constructed. The ducts are secured by the groundings screw 40. As mounted in the sockets, the ducts are open to the hollow chamber of the housing 20.

The hollow chamber in the housing 20 is divided into a power compartment 41 and a communication compartment 42 which are respectively open to the power and communications ducts to receive cables therefrom. This division is achieved through the divider mechanism generally indicated at 43. The divider mechanism extends transversely between the center sections of the adaptors and vertically between the base and top sections.

Figure 3:
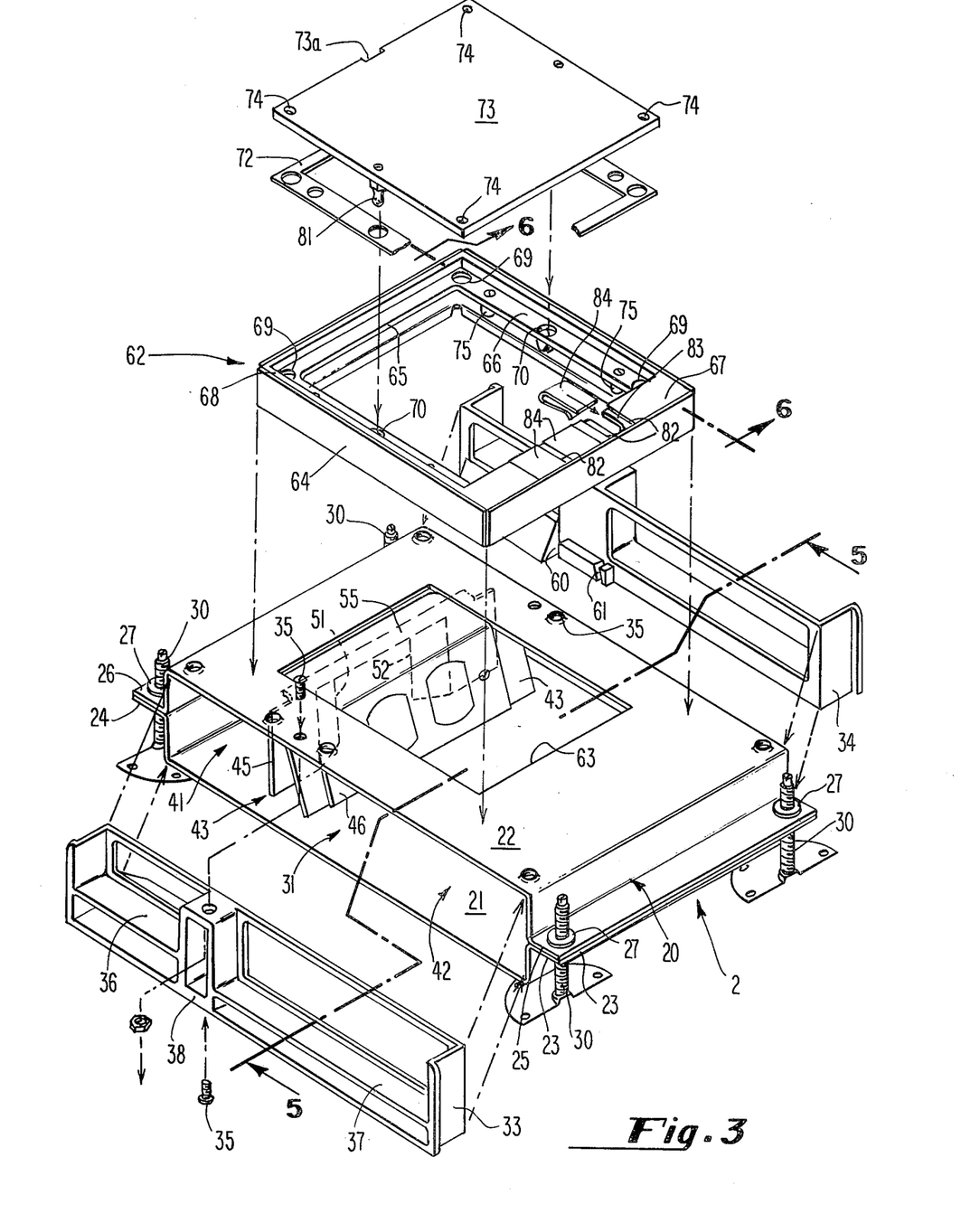
FIG. 3 is an exploded view of certain of the components of FIG. 2.
Figure 7:
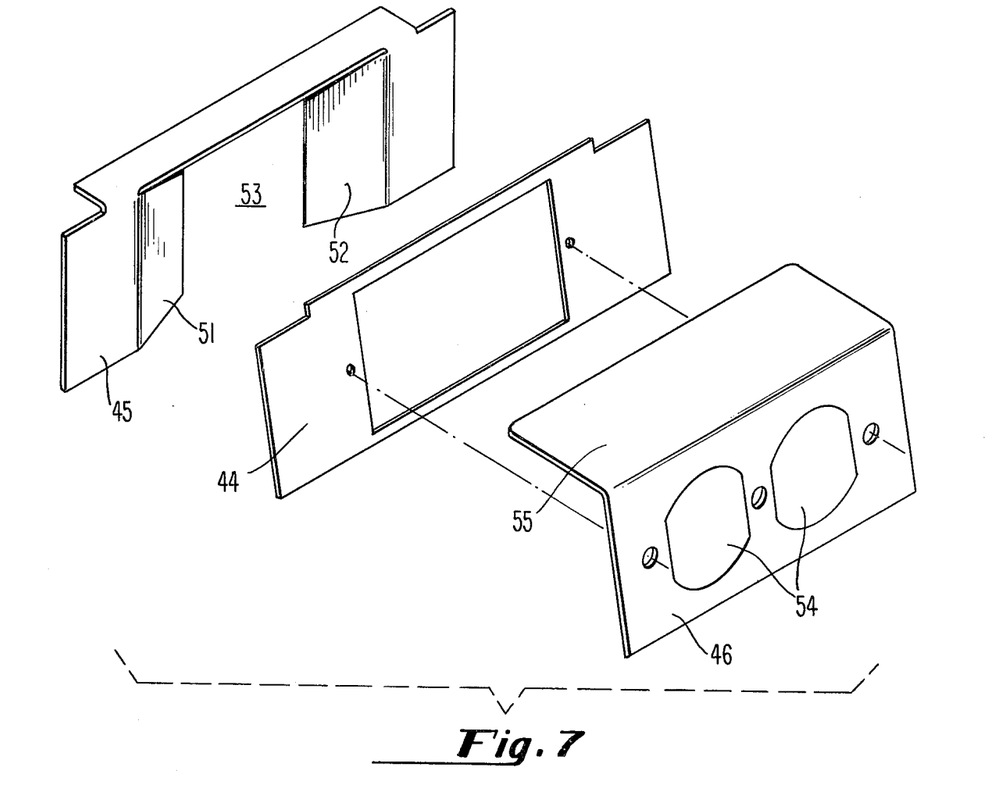
FIG. 7 is an exploded view of certain of the components of FIGS. 2 and 3.

Referring to FIGS. 3, 4 and 7 the divider mechanism 43 comprises a jack or receptacle retainer plate 44, a barrier partition plate 45 and a cover plate 46.

The jack retainer plate 44 is adapted to mount a jack or receptacle 50. The barrier partition plate 45 is spaced from the retainer plate 44 a distance sufficient to accommodate the receptacle 50. The barrier plate has a pair of bent back ears 51 and 52 which form an opening 53 to the power compartment 41. The opening permits passage of cables to the jack or receptacle 50.

The cover 46 has a pair of knock-outs 54 which are removed at the time the jack or receptacles is installed. The cover 46 has an extension 55 which extends over the space between the plates 44 and 45 and over a portion of the power compartment 41.

Figures 2, 12:
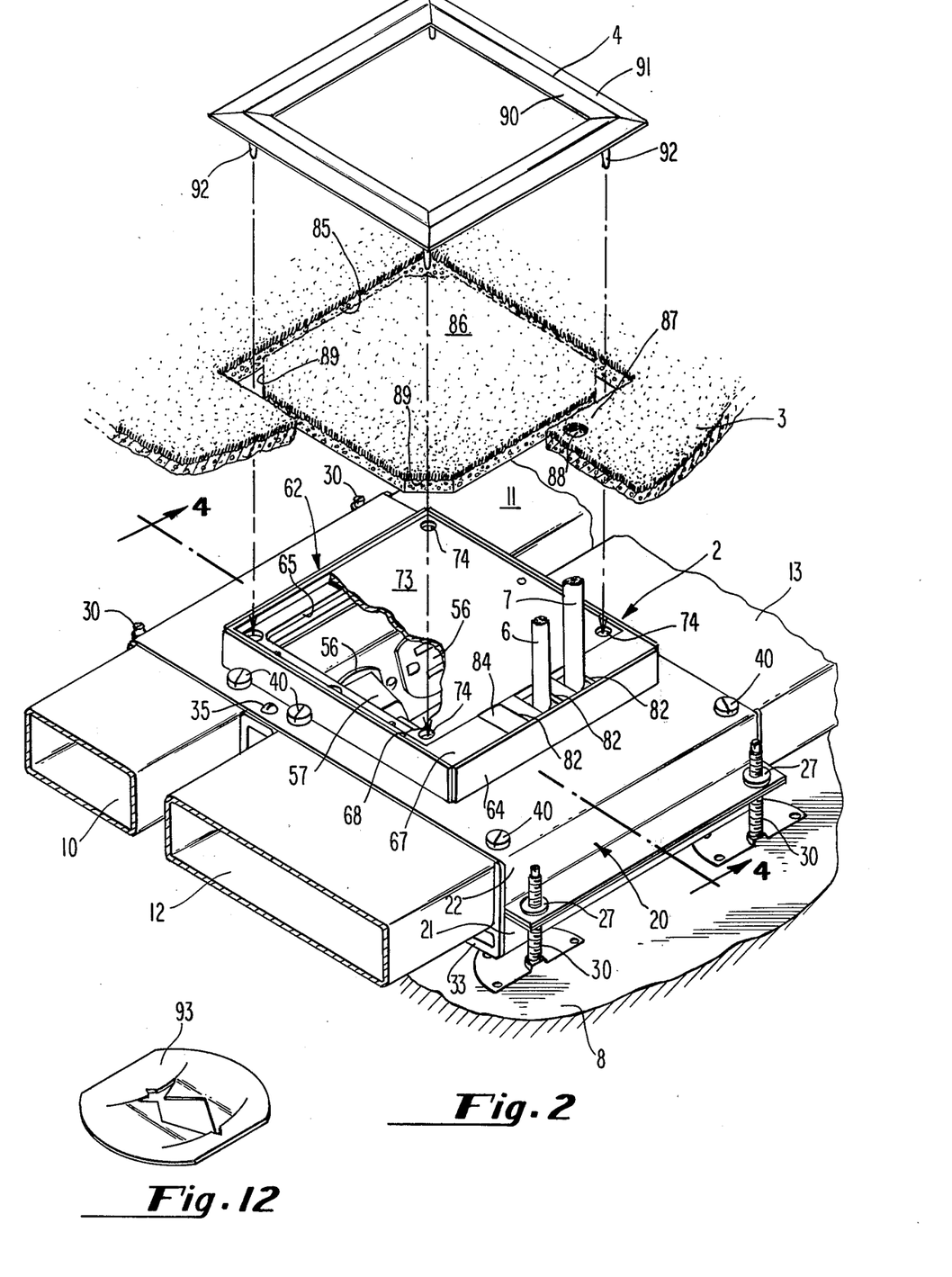
FIG. 2 is a perspective view, partially exploded, of one embodiment of the invention.
FIG. 12 is a perspective view of a push-on a fastener.

It will be seen, therefore, that the power and communications compartments are electrically isolated from one another by the divider mechanism 43. Note that the insert section 56 (FIG. 2) of the receptacle 50 faces the communications compartment and that the plug 57 in the insert section extends into this compartment. A clamp 58 for securing the telephone amphenol connector 59 is also located in the communications compartment.

Figure 8:
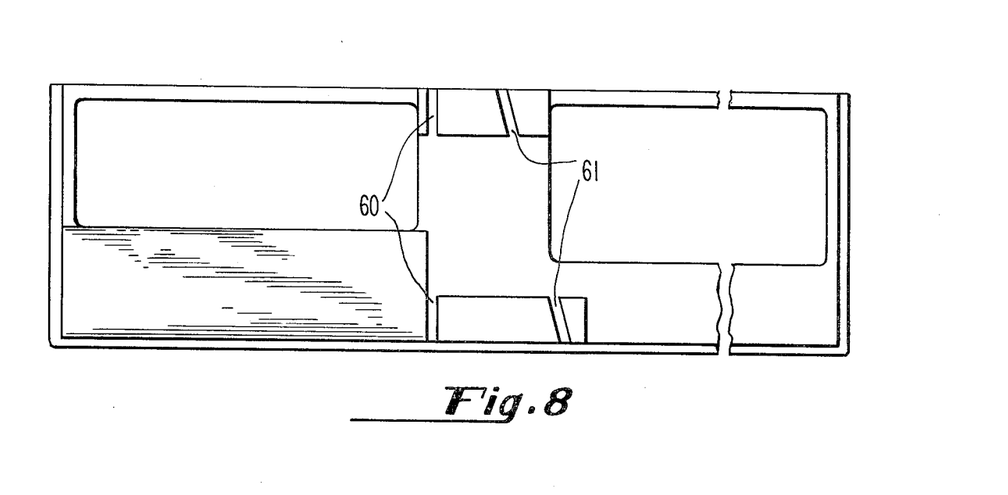
FIG. 8 is a fragmentary elevational view illustrating the mounting method for the components of FIG. 7.

The retainer and barrier plates are installed in position simply by sliding into slots formed in the adaptors 33 and 34. This arrangement is shown in FIG. 8, for the adaptor 34. The aligned openings 60 form a vertical slot to retain the barrier plate and the aligned slots 61 form slanted slot to mount the retainer plate.

The entrance mechanism 62 which provides for above-the-floor access to the compartments 41 and 42 and for the passage of the service cables out above the floor surface will next be describe.

The top section 22 has an access opening 63. A plaster ring 64 surrounds the opening and is secured to the top section 22. The plaster ring extends upwardly and as noted in FIG. 4 provides a ground for the concrete 1.

Inside of the plaster ring is an adjustable ring 65 which has inwardly extending, annular cover mounting section 66 and inwardly extending service cable exit section 67 which extends along one edge of the mounting section and is flush with the top edge 68 of the ring.

Figure 6:
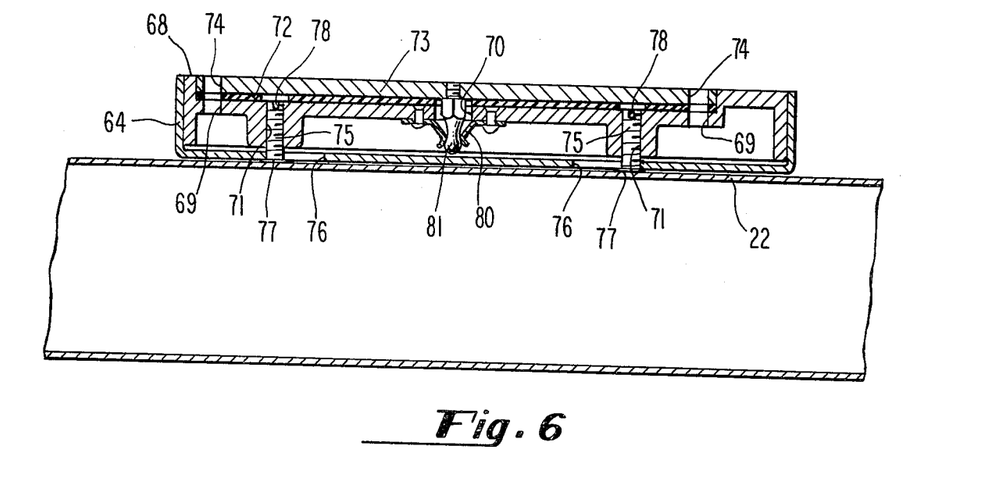
FIG. 6 is a fragmentary view taken along the lines 6—6 of FIG. 3.

Referring to FIGS. 3 and 6 cover mounting section 66 has four trim ring apertures 69 (one on each corner), a pair of cover locking apertures 70 and four threaded adjusting apertures one pair of which are indicated at 71 in FIG. 6. Another pair is on the opposite side of the ring.

The mounting section 66 carries a gasket 72 with apertures corresponding to the above mentioned apertures in the ring. A cover 73 is adapted to rest on the gasket 72 with the surface of the cover flush with the top edge 68 of the adjusting ring and with the top surface of the cable exit section 67. The cover has trim ring apertures 74.

The adjusting ring 65 can be moved in a vertical direction either straight up and down or tilted as noted following:

With reference to FIG. 6, the apertures 71 carry adjusting screws 75 which extend thru slots 76 in the plaster ring 64. The lower end of each screw has a head 77 captured between the top section 22 and the plaster ring 64. The connection provides for the ring to be rotatable but not movable axially. The top of the screw is slotted as indicated at 78. With the cover 73 removed, a screw driver can be inserted in the slot 78 to turn the screw and thus move the ring vertically.

The cover 73 is removably held on the cover mounting section 66 as follows. On the underside of the cover mounting section and below the cover locking apertures 70 are the ball clips 80. Secured to the underside of the cover are a pair of ball studs 81 which mate with the clips as noted in FIGS. 4 and 6 to hold the cover in place. The engagement is such that the cover can be easily pried off by means of a screw driver in slot 73a.

The structure and function of the service cable exit section 67 will next be described.

The cable exit section 67 has a plurality of service cable slots 82 which are open to the communications compartment 42. As noted in FIG. 3, the slots are shouldered at 83 to provide seating for the closure clips 84. The closure clips are flush with the exit surface and extend down over the edge of and underneath the exit section are are held in position by the spring action.

During the shipment of the fitting and during installation the three clips 84 are in position on the exit section. At the time of wiring one or more of the clips is removed depending upon the number of cables to be brought out from the interior.

The carpeting arrangement for the cover 73 and the exiting of the cables thru the exit section and carpet are noted below.

A rectangular cut is made in the carpet 3 to form opening 85 and remnant 86. The opening is slightly greater in cross section than the cover 73. The remnant is mounted on the cover. A section 87 of the carpet 3 overlies the cable exit section 67. In the section 87, appropriate slits or holes such as hole 88 are formed so as to accommodate the cables. The edge of the opening 85 and the edge of the remnant 86 are covered by the trim ring 4. The corners of the remnant 86 are chamfered at 89 so that when the remnant is on the cover the trim ring apertures 69 are exposed.

The trim piece 4 has inboard flange 90 and outboard flange 91. On the underside of the trim piece are four tapered studs 92. When the trim ring 4 is down on the carpet as seen in FIG. 4, the studs 92 can pass thru the remnant 86 by virtue of the chamfered corners 89, thru the apertures 74 in the cover 73 and thru the apertures 70 in the mounting section 66. Push-on fasteners 93 are secured to the studs in contact with the underside of the cover. Thus, the cover, the carpet and the trim ring are held together as an assembly.

It will be understood that for installing the cover, carpet and trim piece assembly, the same is put together divorced from the fitting and then dropped into place and pushed down so that the studs 92 enter the apertures as noted above and the ball studs 81 engage the ball clips 80. The assembly can be removed by inserting a screw driver under the outboard flange and prying up the trim ring which carries the carpet and cover with it and then performing the same operation on the opposite side. One particular advantage of the assembly structure is that there is automatic compensation for carpet thickness.

The fitting can be used without the carpet trim ring. In such cases, the cuts for opening 85 are very carefully made and corners of the remnant are not chamfered. Also the remnant 86 is held on the cover by carpet tape or adhesive.

In instances where the floor covering is tile rather than carpet it is desirable that the underside of the trim ring be substantially flat except for the studs. The flat condition is to ensure that the trim ring lies close to the tile.

It will be evident from the foregoing description that with the cover/carpet/trim ring assembly removed there is ample access to the interior of the housing for wiring in the jack or receptacle 50, installing the plug 56 and for securing the amphenol connector 59.

The service cable can be installed by removing the plug or connector either at the fitting end or at the equipment end. The free end is then pushed or threaded thru the closure slots 64 and carpet. With reference to FIGS. 1 and 4, note that the outboard flange 91 of the trim ring is closed to the service cables but that the cover/carpet/trim ring assembly can be removed and replaced without disturbing the service cables.

Figure 9:
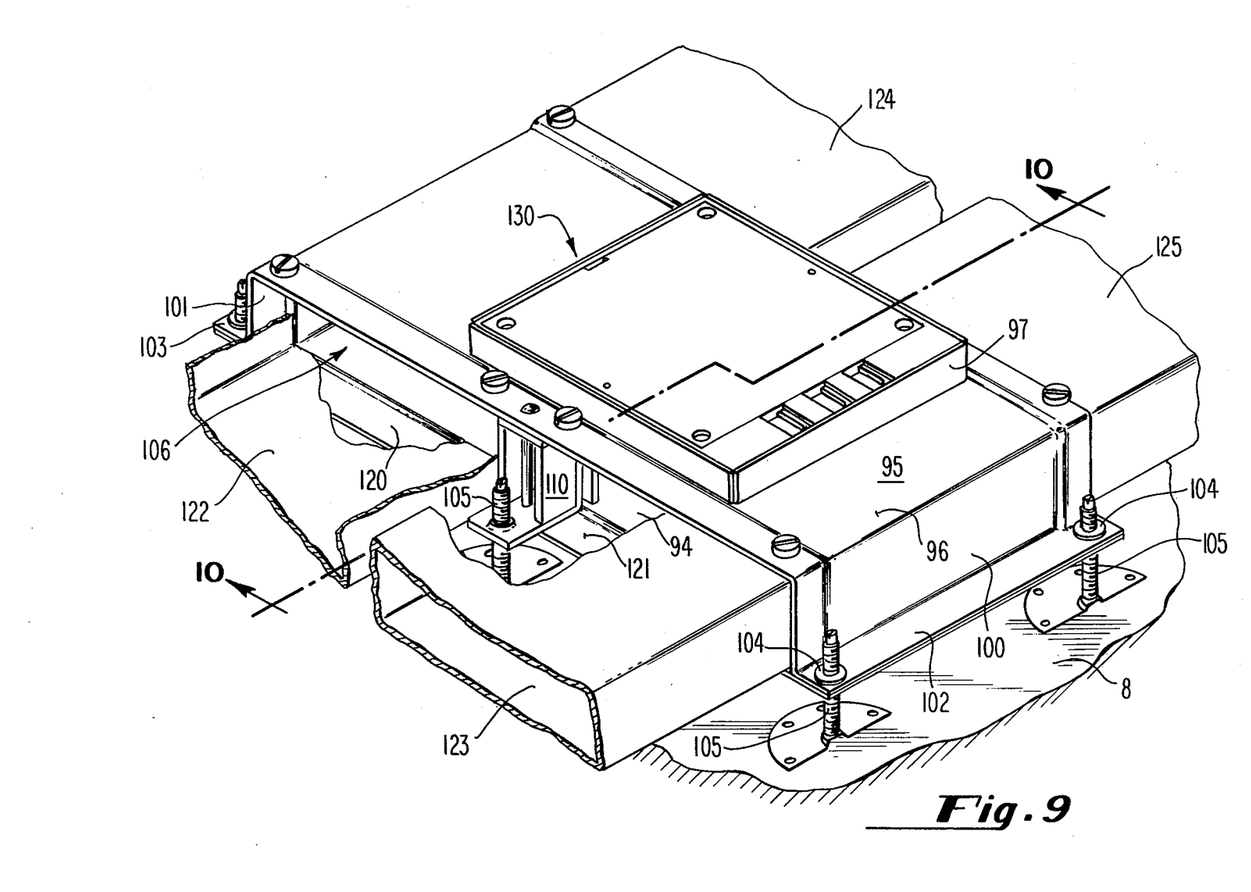
FIG. 9 is a perspective view of another embodiment of the invention.
Figure 10:
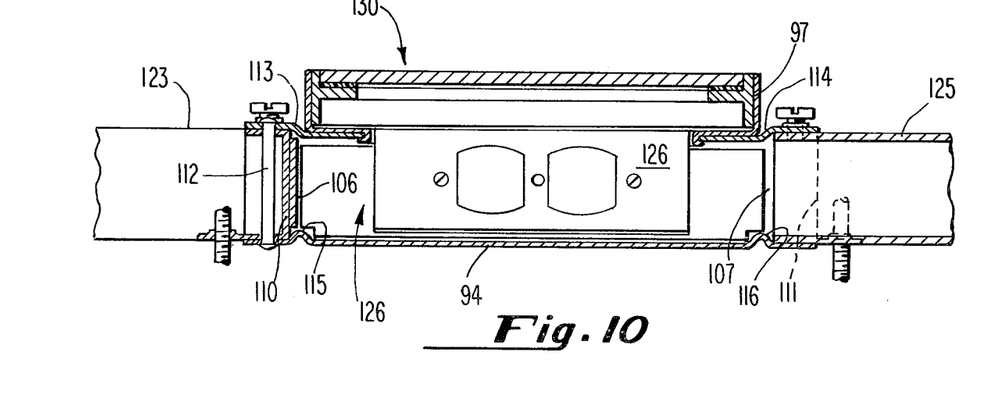
FIG. 10 is a view taken along the lines 10—10 of FIG. 9.
Figure 11:
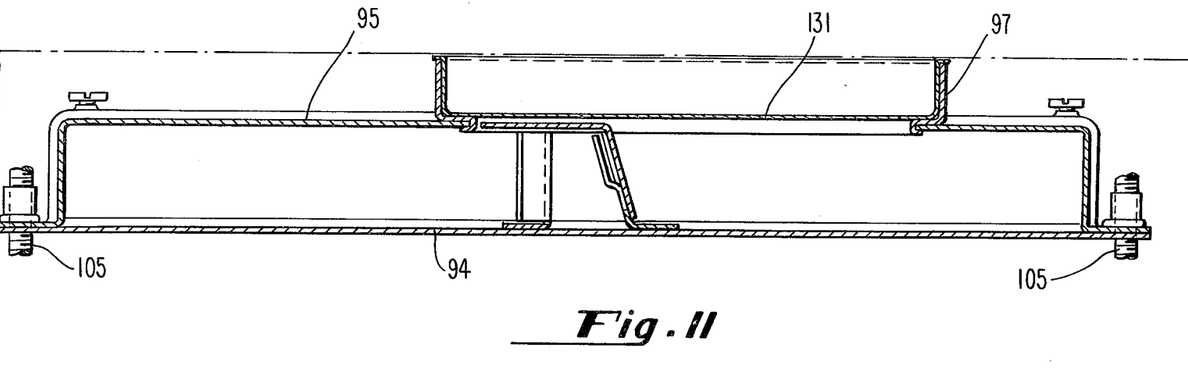
FIG. 11 is an elevational view illustrating the manner in which the invention is set up in a non-service condition.

In FIGS. 9, 10 and 11 another embodiment of the invention has a modified housing design and is equipped with larger power ducts for increased capacity.

The base section 94 is flat. The top section 95 has a top wall 96 mounting plaster ring 97 and opposite side walls 100 and 101 which extend downwardly and have flanges 102 and 103 engaging the opposite edges or flanges of the base 94. The flanges are secured together by the Riv-nuts 104 carrying the adjusting screws 105.

The sections 94 and 95 form a hollow housing having duct openings 106 and 107 which extend between the flanges. At the center of each opening is a center section or post. These are designated at 110 and 111. As noted in FIG. 10, the center section or post 110 is held in position as by the rivet 112. A similar rivet holds post 111. Each center section carries an adjusting screw 105.

These center posts 110 and 111 and the shoulders 113 and 114 on the top section 95 and the bosses 115 and 116 on the base section 94 form sockets such as 120 and 121 which respectively carry the power duct 122 and communication duct 123. A similar socket arrangement in opening 107 carries power duct 124 and communications duct 125.

The interior of the housing is divided into power and communication compartments as by the divider mechanism 126 which extends laterally between the posts 110 and 111 and vertically between the base section 94 and top section 95. The divider mechanism 126 has the same construction as the divider 43 except that it is secured to the base section 94 as by spot welding.

The entrance mechanism 130 is identical to the entrance mechanism 62 and is employed in the same manner.

In certain instances the fittings are installed in the inactive condition, that is to say with the entrance mechanism removed. This arrangement is illustrated in FIG. 11 where it will be observed that the blanking cap 131 has replaced the entrance mechanism in the plaster ring 97. During the pour, the cap 131 is adapted to be filled with concrete. When the fitting is to be activated the concrete is chipped away around the edges and the blanking cap lifted out and replaced by the entrance mechanism.

We claim:

1. In an out-of-sight service fitting:
    a U-shaped base section having a pair of flanges respectively at opposite edges of the section;
    a U-shaped top section overlying the base section and having a pair of flanges respectively engaging first said flanges, the base and top sections forming a hollow chamber with a pair of duct openings to the chamber extending between said flanges and the top section having an access opening providing access to the hollow chamber;
    means connected with said sections to mount the same on the area to be filled with concrete and to raise and lower the sections with respect to the area;
    a pair of adaptors respectively disposed in said duct openings, each adaptor having a socket for mounting a power duct and a socket for mounting a communications duct, the sockets being separated by a center section;
    mechanism in said chamber and extending between said adaptors and between said base and top sections and forming a barrier across the chamber and having jack means for mounting an electrical plug, the barrier dividing the chamber into a power compartment and a communications compartment electrically isolated from one another and respectively open to said sockets, the sockets providing passageways respectively between the power and communications compartments and the power and comunications ducts when the same are mounted in the sockets and said jack means facing said communication compartment for receiving a plug and said communications compartment being adapted to receive a communications connector and also form a passageway for power and communication service cables extending from the fitting;
    a plaster ring fixed to the top of said top section around said access opening;
    an adjusting ring inside of said plaster ring and having an inwardly extending cover mounting section and a inwardly extending service cable exit section, the cover mounting section having a plurality of threaded adjusting apertures;
    a set of adjusting screws each having a head and a slotted end, the screws being respectively disposed in said threaded adjusting apertures with the heads between the plaster ring and the top of the top section for rotation without axial motion, the slotted ends providing a means for a tool to be inserted therein for turning the screw and the turning of the screw causing the adjusting ring to move in a vertical direction with respect to the plaster;
    a plurality of service cable slots in said service cable exit section and open to said communications compartment to receive service cables therefrom;
    a cover on said mounting section and flush with the top edge of the adjusting ring and with the top of said service cable exit section and one edge of the plate being adjacent said closure clips;
    means for removably securing the cover to said cover mounting section;
    a plurality of trim ring apertures in said cover mounting section and a plurality of trim ring apertures in said cover;
    a section of carpet on said cover and a piece of carpet on said service cable exit section, the piece having at least one opening through which a service cable extends;
    a trim ring having inboard and outboard flanges and a plurality of studs connected to the underside of the ring, said inboard flange extending over the peripheral edge of said section of carpet and said outboard flange extending over the edge of said piece of carpet and said studs extending down through said section of carpet and through said trim ring apertures;
    a plurality of fasteners respectively on said studs and engaging the underside of said cover for maintaining the cover, the section of carpet mounted thereon and the trim ring as an assembly; and
    said outboard flange being disposed with respect to said slots to provide clearance space for exit of said service cable whereby said assembly can be removed and replaced without interference from said service cable.

2. In an out-of-sight fitting:
    a flat base section;
    a top section having a flat top wall and two opposite ends having side walls extending downwardly therefrom, each side wall terminating in a flange and the flanges respectively engaging opposite edges of the base section and being fixedly secured thereto, the base and top sections forming a hollow chamber having a pair of duct openings, the respective duct openings being adapted to receive underfloor power and communications ducts for carrying electrical cables to said hollow chamber and said top wall having an access opening providing access to the hollow chamber;
    means connected with said sections to mount the same on the area to be filled with concrete and to raise and lower the section with respect to the area;
    in each of said duct openings, a center post separating the opening in two parts, one for a power duct and the other for a communications duct;
    mechanism in said chamber and extending between said center posts and between the base and top wall and forming a barrier across the chamber and having jack means for mounting an electrical plug, the barrier dividing the chamber into a power compartment and a communications compartment electrically isolated from one another and respectively open to said power and communication ducts when same are mounted in said openings and said jack means facing said communications compartment for receiving a plug and said communication compartment being adapted to receive a communications connector and also form a passageway for power and communications service cables exiting from the fitting;

a plaster ring fixed to the top of said top section around said access opening;

an adjusting ring inside of said plaster ring and having an inwardly extending cover mounting section and an inwardly extending service cable exit section, the cover mounting section having a plurality of threaded adjusting apertures;

a set of adjusting screws each having a head and a slotted end, the screws being respectively disposed in said threaded adjusting apertures with the heads between the plaster ring and the top section for rotation without axial motion, the slotted ends providing a means for a tool to be inserted therein for turning the screw and the turning of a screw causing the adjusting ring to move in a vertical direction with respect to said plaster ring;

a plurality of service cable slots in said service cable exit section and open to said communication compartment to receive service cables therefrom;

a cover on said mounting section and flush with the top edge of the adjusting ring and the top of said service cable exit section and one edge of the cover being adjacent said closure clips;

means for removably securing the cover to said cover mounting section;

a plurality of trim ring apertures in said cover mounting section and a plurality of trim ring apertures in said cover;

a section of carpet on said cover and a piece of carpet on said service cable exit section, the piece having at least one opening through which a service cable extends;

trim ring having inboard and outboard flanges and plurality of studs connected to the underside of the ring, said inboard flanges extending over the peripheral edge of said carpet and said outboard flange extending over the edge of said piece of carpet and said studs extending down through said section of carpet and through said trim ring apertures;

a plurality of fasteners respectively on said studs and engaging the underside of said cover for maintaining the cover, the section of carpet mounted thereon and the trim ring as an assembly; and said outboard flange being disposed with respect to said slots to provide clearance for exit of said service cable whereby said assembly can be removed and replaced without intereference from said service cable.

3. In an out-of-sight fitting:

housing means forming a hollow chamber including mechanism dividing the chamber into a power compartment and a communications compartment electrically isolated from one another for receiving electrical cables from underfloor power and communications ducts and said communications compartment being adapted to receive a communications connector and also form a passageway for power and communication service cables exiting from the fitting;

means for mounting a jack on said mechanism electrically open to said power compartment for receiving electrical cables therefrom and facing said communications compartment for receiving a plug;

an access opening in the top of said housing means;

a plaster ring connected to the top of said housing means and surrounding said access opening;

an adjusting ring inside of said plaster ring and having an inwardly extending cover mounting section and an inwardly extending cable exit section, the ring having a plurality of threaded adjusting apertures;

means connected between said threaded apertures and said housing means and providing for vertical adjustment of the ring with respect to said plaster ring;

a plurality of service cable slots in said cable exit section and open to said communication compartment to receive electrical service cable therefrom;

a cover on said mounting section and flush with the top edge of the adjusting ring and with the top of said cable exit section and one edge of the cover being adjacent said closure clips; and means connecting the cover to said ring and providing for the cover to be removed therefrom;

a plurality of cover locking apertures and a plurality of trim ring apertures in said cover mounting section and a plurality of trim ring apertures in said cover plate;

a section of carpet on said cover and a piece of carpet on said service cable exit section, the piece having at least one opening through which a service cable extends;

a trim ring having inboard and outboard flanges and a plurality of studs connected to the underside of the ring, said inboard flange extending over the peripheral edge of said section of carpet and said outboard flange extending over the edge of said piece of carpet and said studs extending down through said section of carpet and through said trim ring apertures;

a plurality of fasteners respectively on said studs and engaging the underside of said cover for maintaining the cover, the section of carpet mounted thereon and the trim ring as an assembly; and said outboard flange being disposed with respect to said slots to provide clearance for exit of said service cable whereby said assembly can be removed and replaced without interference from said service cable.

4. The fitting of claim 3 wherein said means for removably securing the cover to said ring comprises:

a pair of ball clips on the underside of said cover mounting section respectively adjacent said cover locking apertures; and a pair of ball studs fixed to the underside of said cover and extending thru said cover locking apertures and engaging said ball clips for removably securing the cover in place.

5. In an out-of-sight service fitting, the assembly comprising:

an adjustment ring having an inwardly extending cover mounting section and an inwardly extending cable exit section;

a plurality of trim ring apertures in said mounting section;

a plurality of service cable slots in said cable exit section for passing cables from the inside of the fitting to the outside;

a cover on said mounting section and flush with the top edge of the adjusting ring and with the top of said cable exit section and one edge of the cover being adjacent said service cable exit slots;

a plurality of trim ring apertures in said cover;

a section of carpet on said cover and a piece of carpet on said service cable exit section, the piece having at least one opening thru which a service cable extends;

a trim ring having inboard and outboard flanges and a plurality of studs connected to the underside of the ring, said inboard flange extending over the peripheral edge of said section of carpet and said outboard flange extending over the edge of said piece of carpet and said studs extending down thru said section of carpet and thru said trim ring apertures;

a plurality of fasteners respectively on said studs and engaging the underside of said cover and maintaining the cover, the section of carpet and the trim ring as an assembly; and said outboard flange being disposed with respect to said slots to provide clearance for exit of said service cable whereby said assembly can be removed and replaced without interference from said service cable.

* * * * *